G. GROS.
Percussion Cap Box.
No. 93,432.
Patented Aug. 10, 1869.
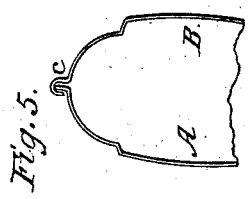
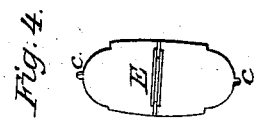
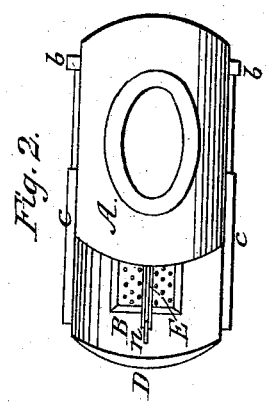
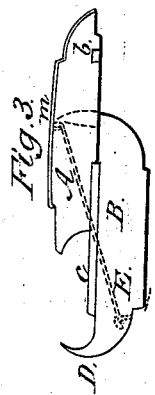
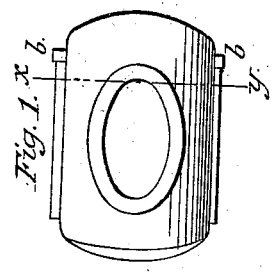
Witnesses
Inventor,

United States Patent Office.

GEORGES GROS, OF BORDEAUX, FRANCE.

Letters Patent No. 93,432, dated August 10, 1869.

---

IMPROVEMENT IN POCKET-BOX FOR PERCUSSION-CAPS, &c.

---

The Schedule referred to in these Letters Patent and making part of the same.

---

*To all whom it may concern:*

Be it known that I, GEORGES GROS, of the town of Bordeaux, in the department of the Gironde, in the Empire of France, have invented an Improved Pocket-Box for Percussion-Caps, or other articles, to be called Box of Gros's System, or, in other words, "a novel kind of self-closing boxes, permanently kept closed, and intended to contain such objects or substances as require to be carefully shut up;" and I do hereby declare that the following is a full and exact description thereof, reference being had to the accompanying drawings, and to the letters of reference marked thereon—

My attention having been drawn to the numerous inconveniences and accidents resulting from the brittleness of small boxes, made either of pasteboard, wood, or other material wanting strength, which boxes, yielding to the least pressure, are thrown out of shape, thereby permitting the escape of their contents, to which they also give no sufficient protection against outward pressure—a most serious defect when such boxes contain chemical matches; and it is more especially on account of such matches, the use of which is now so extensive, that I have been led to the combination of a kind of box which can be made of sheet-metal sufficiently resistant to prevent the accidents alluded to.

The peculiar formation of my improved boxes permits their manufacture by machinery, and enables me to produce and sell them at a very trifling price.

I cut my metal in the exact form by cutting-dies, and shape the parts into the proper swelled and folded conditions by suitable male and female dies. The manufacture will present no difficulty to mechanics, in view of the description and drawings.

The boxes of my invention are intended to contain chemical matches, medicamental or pharmaceutical substances, sugar-plums, perfumes, jewels, cigaritos, percussion-caps, in fact any substance or object, either delicate, dangerous, or precious.

I will first describe what I consider the best means of carrying out my invention, and will afterward designate the point or combination of features or qualities which I believe to be new.

The accompanying drawings form a part of this specification.

The shape which I have adopted for the box represented on the drawing, is that which I prefer for chemical-match boxes, as being the most convenient for carrying in the waistcoat-pocket without hindering or clogging it, and without fear of crushing or breaking.

This box is formed with two cases or shells of a rectangular shape, but rounded off at each end. The deeper one is the receptacle, and the flatter, the lid. The straight edges of both parts are formed so as to enter and slide in one another. They are tied to each other, either by means of a small steel or wire spring, or by a thin strip of Indiarubber acting as a spring, and keeping them closed.

The box can be opened very easily by sliding the lid with the thumb of the hand in which the box is held. On the pressure of the thumb being removed, the lid instantly slides back and closes the box, this being effected by the action of the small spring lodged inside.

Instead of a single spring, two might be used, one on each side.

That part of the top of the lid against which the thumb is to bear slightly, in order to open the box, is clearly indicated by the exergue, or the obligatory embossing of any patented article, the under side of the box being either pointed, cut in the casting, or in any way roughened to give a rubbing-surface on which to ignite the matches.

On the annexed sheet of drawing—

Figure 1 is a top view of the box shut up;

Figure 2 shows the box opened sufficiently to permit a match to be taken out;

Figure 3 is a side view of fig. 2; and

Figure 4, a cross-section through the line $x\, y$, fig. 1.

A is the upper shell or lid.

B is the under shell or receptacle.

$c$ are the sliding edges, shown on a larger scale in fig. 5.

The edges of the body B of the box are bent or crooked, and form a groove to receive the edges of the lid which slide within it.

The end D of the box is shaped, as shown, fig. 3, to stop the ends of the lid.

The projecting ends $b$ of the slides also serve to stop the lid.

E is a small strip or string of India rubber, one end fastened in the box, and the other in the lid.

I provide an eye or hook, $m$, in the upper shell or cover A, and a corresponding eye or hook, $n$, in the under shell or box proper B, and attach the rubber to these eyes, as represented.

The hook $m$ serves as a stop to prevent any possible overstraining of the spring. It prevents the cover A from being drawn back too far.

By reason of the fact that my box is made of sheet-metal, I am able not only to form it, by dies and analogous machinery, with great rapidity and with mathematical exactness of form, but I produce a box which is unaffected by water, perspiration, or the like, and which is much stronger than any for similar purposes before known to me; and by reason of the fact that my parts A and B are formed and adapted to each other, as represented, I am able to open the box by the motion of the thumb and fingers of the same hand in which it is held; in other words, my box is not only a self-closing box, opening and closing with a sliding motion, and protecting the contents as represented, but is held and operated conveniently with one hand, may be cheaply made, and is insensible to the influence of water.

It is also much stronger than the ordinary pasteboard box, and will bear the weight of the person or other crushing force which it may receive in the exigencies of hunting, fishing, or of ordinary life.

I claim as my invention, and desire to secure by Letters Patent—

The within-described metallic sliding box, without hinges, formed in parts, adapted to be operated by the thumb and finger of one hand, and consisting of the body B, cover A, spring E, and stops *m* and *b*, constructed and arranged for joint operation, substantially as and for the purposes herein set forth.

G. GROS.

Witnesses:
  F. OLCOTT,
    *United States Deputy Consul,*
  D'AUBRÉVILLE, *C. E.,*
    60 *Boulevart de Strasbourg.*